Figure 1:
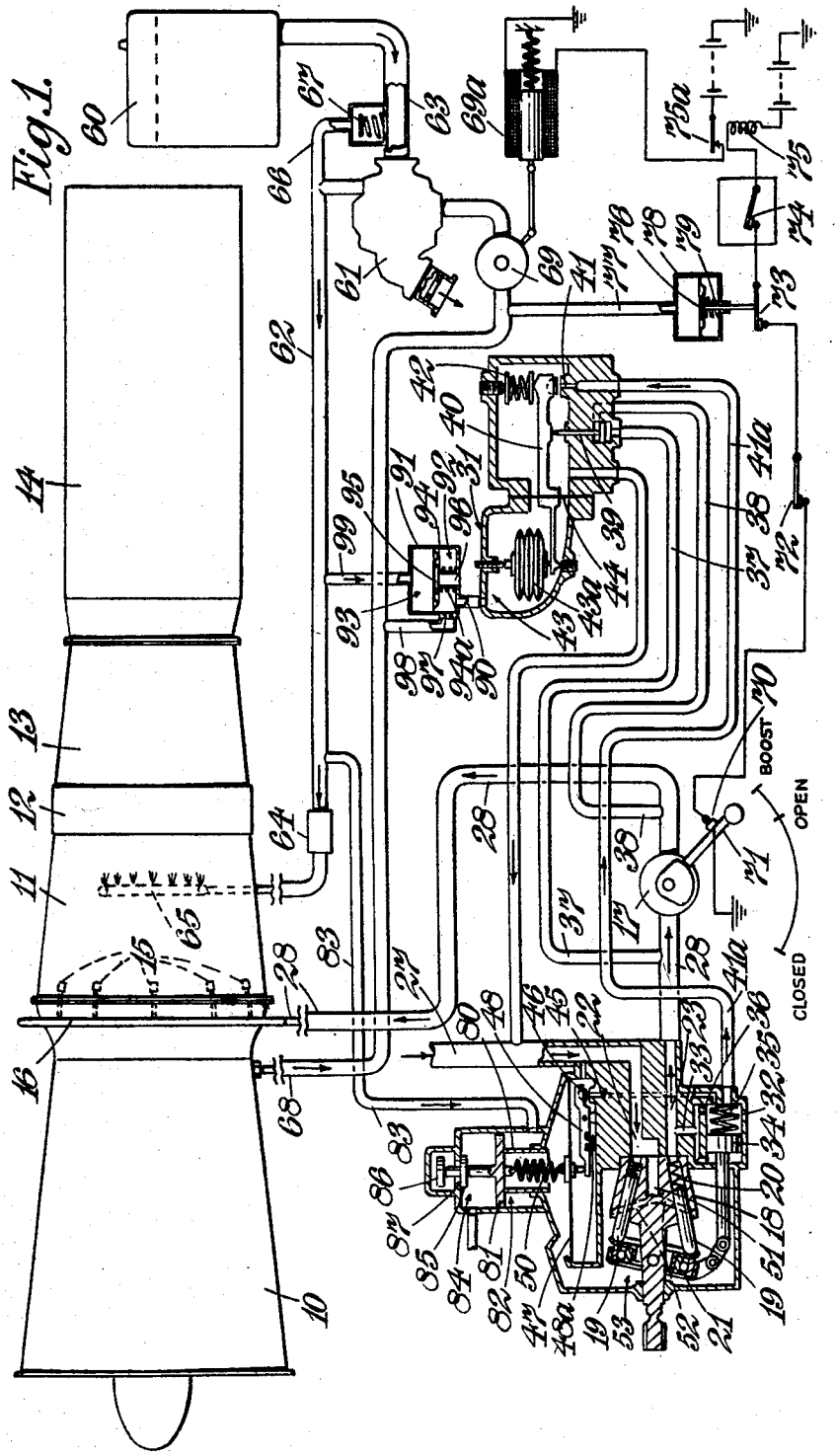

United States Patent Office 2,919,548
Patented Jan. 5, 1960

2,919,548

PRIME MOVER WITH MEANS TO CONTROL INJECTION OF COOLING FLUID INTO WORKING MEDIUM THEREOF

Karl Herbstritt, Chellaston, England, assignor to Rolls-Royce Limited, Derby, England, a British company Application November 10, 1953, Serial No. 391,286

Claims priority, application Great Britain November 26, 1952

15 Claims. (Cl. 60—39.26)

This invention relates to prime movers of the kind (hereinafter referred to as the kind specified) in which fuel is burnt to heat the working fluid of the prime mover and in which an additional fluid is injected into the working fluid for the purpose of cooling the working fluid.

One form of prime mover of the kind specified is a gas-turbine engine having combustion equipment in which fuel is burnt to heat air delivered by a compressor, the heated air being fed to a turbine to drive it and having means to inject a coolant such as water into the combustion chambers to cool the combustion gases prior to their entry into the turbine. In another form the coolant, instead of being injected into the combustion chambers of the engine, is fed into the compressor or directly into the turbine. Instead of water, the coolant may be, for example, a mixture of water and methanol or may be other liquids.

This invention has for an object to enable the power developed by the prime mover to be increased during injection of the coolant.

According to the present invention, in a prime mover of the kind specified, there is provided means to inject a cooling fluid into the working fluid of the prime mover, speed governor means to control a rotational speed condition of the prime mover, and means to adjust the speed governor to increase the governed speed condition during operation of the means to inject the cooling fluid into the working fluid. Where the prime mover is a gas turbine engine having a compressor and a turbine together forming the sole rotor of the engine (apart from auxiliary and accessory drives) the rotational speed condition will be a rotational speed of that rotor. Where the engine is a compound engine having more than one rotor capable of independent rotation, the rotational speed condition may for example be a rotational speed of the high-pressure compressor and turbine rotor.

The rotational speed condition controlled by the speed governor may, for instance, be the maximum permissible speed of the rotor of the prime mover and in this case it will be arranged that during cooling fluid injection the maximum permissible speed is increased as compared with the maximum permissible speed during operation without cooling fluid injection. Alternatively where a rotational speed of the engine is controlled by a governor operative at speeds below the maximum permissible speed, it will be arranged that the speed controlled at a given governor setting is increased on operation of the means to inject cooling fluid.

According to one arrangement of this invention, the speed governor means comprises loading spring means adapted by its load to determine the selected value of the rotational speed, and the means to adjust the speed governor includes an adjustable anchorage for the spring arranged to be adjusted on initiation of the supply of cooling fluid to the engine to vary said load, the adjustment being in the sense such as to increase the governed speed. In one convenient arrangement the adjustable anchorage is connected with pressure-responsive means to be adjusted thereby and the pressure-responsive means is connected to respond to a pressure in the cooling fluid supply means.

According to another arrangement of this invention, the speed governor means comprises a source of pressure fluid whereof the pressure varies in accordance with the rotational speed of the prime mover and first pressure-responsive means adapted to respond to said pressure and connected to effect a control on the prime mover, and the said means to adjust the speed governor means comprises a valve adapted on being operated in one sense to decrease the pressure of said pressure fluid, and second pressure-responsive means adapted to be responsive to the pressure of the cooling fluid supply and adapted by its response to operate the valve in said one sense.

According to another arrangement of this invention, in a prime mover of the kind specified, there is provided speed governor means comprising a governor device to maintain constant the rotational speed of the prime mover at a selected value, manually-controlled selector means adapted to set the selected value of the rotational speed, and adjusting means adapted on operation of the means to inject cooling fluid to adjust said governor device to increase the selected speed value at which the actual rotational speed of a prime mover is maintained. For instance, in one construction, the manually-controlled selector means is a throttle in a fuel supply system of the prime mover, the governor device is adapted to maintain a predetermined fuel flow past said throttle, and the adjusting means is adapted to increase the value of the maintained fuel flow when cooling fluid is injected. It is common in gas-turbine engines to provide an atmospheric pressure-responsive control for automatically decreasing the fuel supply to the engine as the atmospheric pressure decreases, and vice versa, and in accordance with this arrangement of the invention, the governor device may be such an atmospheric pressure-responsive control adapted on initiation of the cooling fluid supply to permit a higher fuel supply to the engine than is permitted during operation without cooling fluid injection by sensing an apparently higher atmospheric pressure than actually exists.

Some arrangements of prime mover and fuel and cooling fluid supply system therefor will now be described with reference to the accompanying drawings in which—

Figure 2:
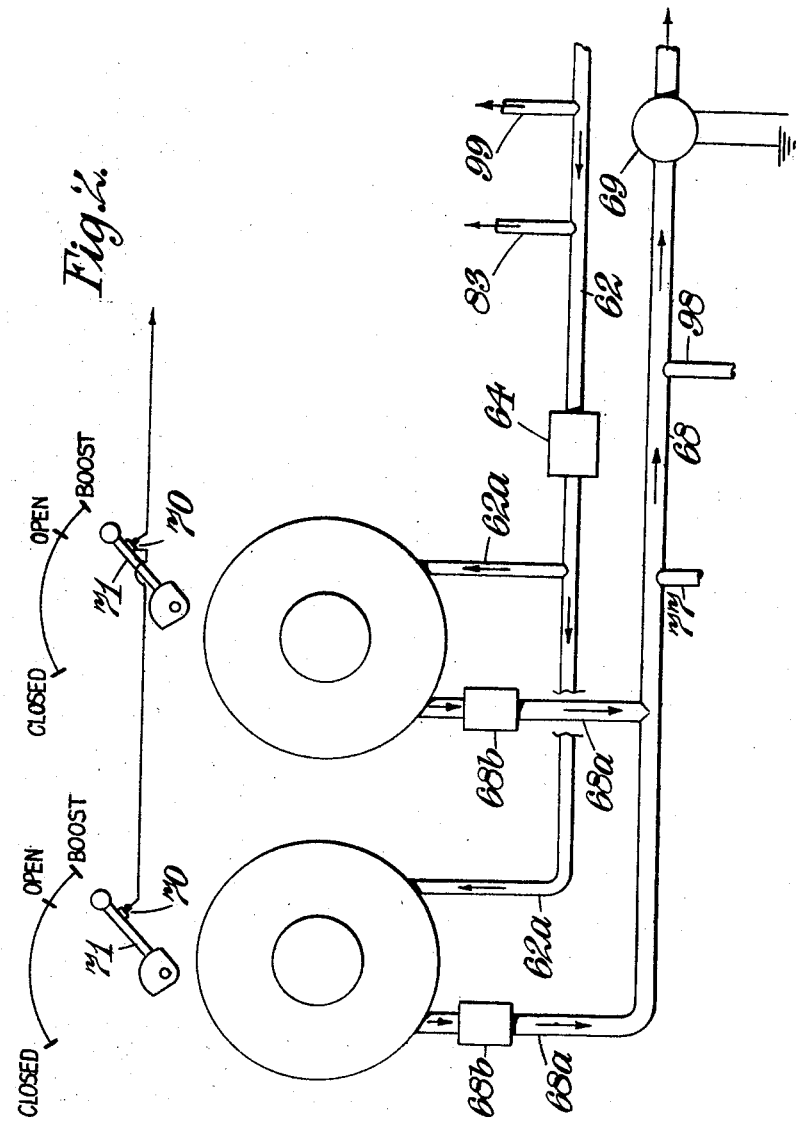
Figure 3:
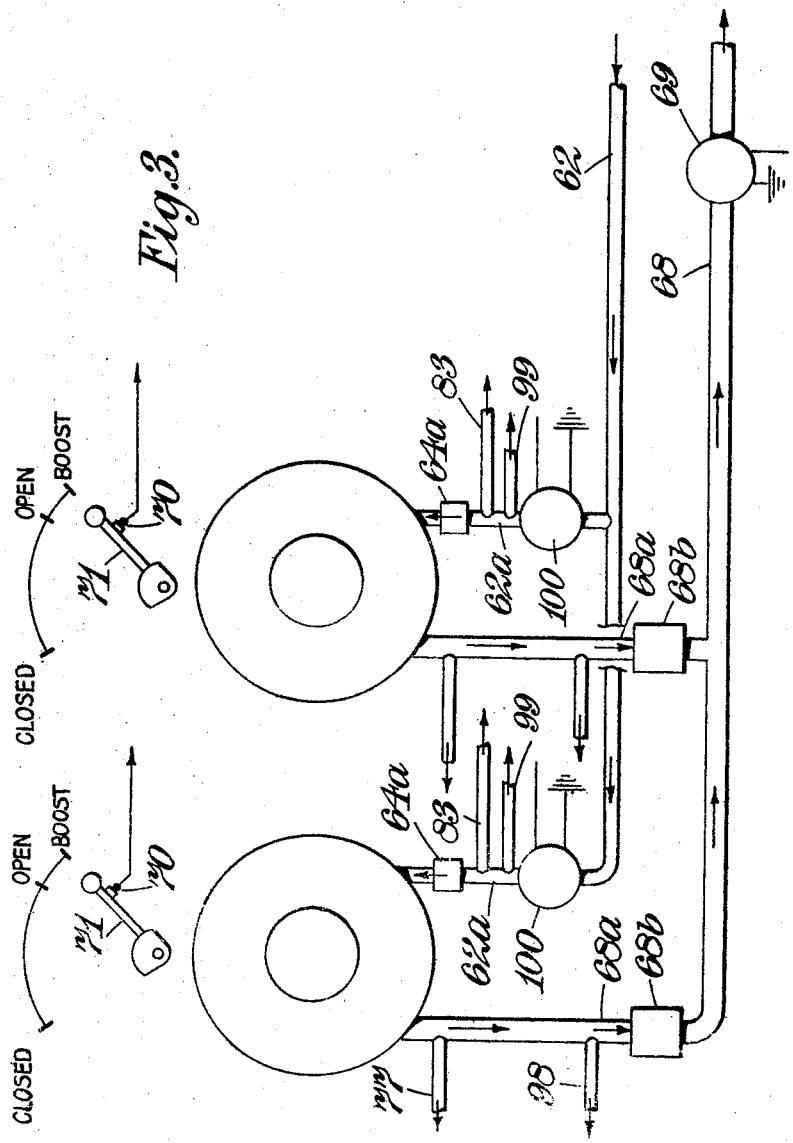
Figure 4:
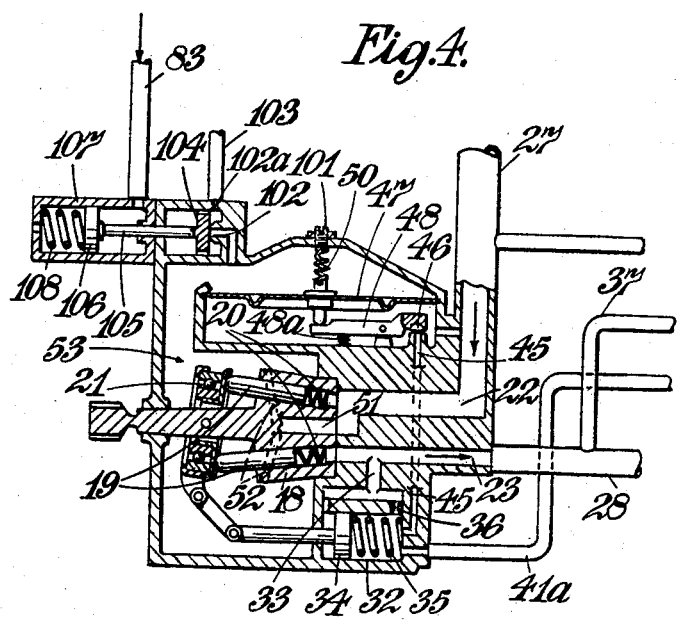
Figure 5:
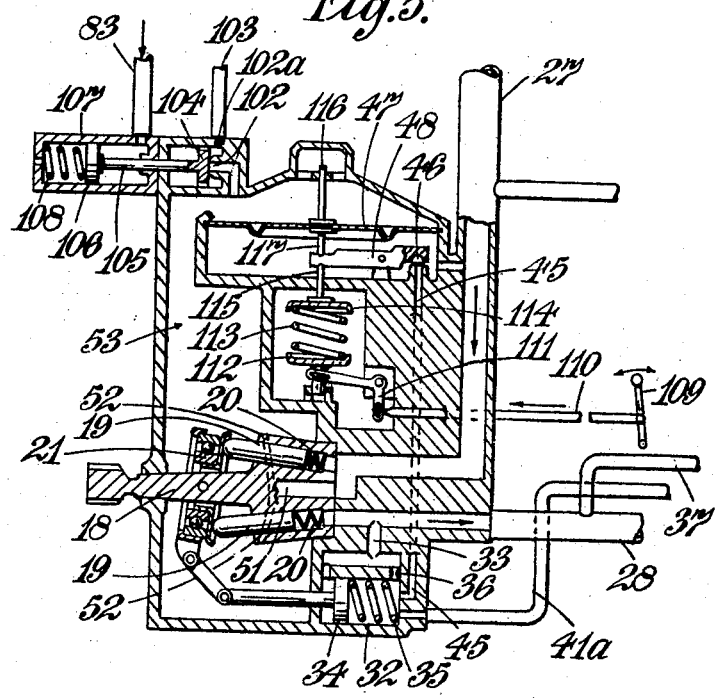

Figure 1 illustrates diagrammatically the prime mover and its fuel and cooling liquid supply systems, Figure 2 illustrates one manner in which a plurality of prime movers as shown in Figure 1 may be controlled, Figure 3 illustrates a second manner in which a plurality of prime movers such as is shown in Figure 1 may be controlled, Figure 4 illustrates an alternative form for part of the fuel and cooling liquid supply system shown in Figure 1, and Figure 5 illustrates yet another alternative form for part of the fuel and cooling liquid supply system.

Referring to Figure 1 of the drawings, the prime mover is illustrated as a gas-turbine engine of the reaction propulsion kind and is illustrated as comprising a compressor 10 which takes in air from the atmosphere and compresses it, combustion equipment 11 which is connected to receive the compressed air from the compressor 10 and also to be supplied with fuel to be burnt with the air, a turbine 12 which is driven by the combustion products received from the combustion chambers 11 and which drives the compressor 10, and an exhaust unit 13 at the outlet side of the turbine to receive the exhaust gases therefrom and to deliver them into a jet pipe 14 through which the exhaust gases pass to atmosphere.

The fuel supply system is shown by way of example as comprising fuel injectors 15 delivering into the combustion equipment 11, and fed from a manifold 16 which is connected with the delivery of an engine-driven fuel pump of the multi-plunger kind through a pipeline 28 containing a throttle 17.

The fuel pump comprises, for instance, a rotor body 18 driven at a speed proportional to the engine speed and having in it a number of inclined bores in which work plungers 19, the plungers being urged in one direction by springs 20 and being moved in the opposite direction on rotation of the rotor body 18 by a swash plate 21 the angle of inclination of which is adjustable to vary the plunger stroke and thus the rate of fuel delivery by the pump. On rotation of the rotor body 18, fuel is drawn into some of the bores in the rotor body 18 through an inlet port 22 and is delivered from the remainder of the bores through an outlet port 23. The pump suction pipe is indicated at 27 and its delivery pipe is indicated at 28. As stated above, the delivery pipe has a throttle 17 connected in it and leads to the manifold 16.

The angle of inclination of the swash plate 21 is controlled by a piston-and-cylinder device 32 whereof the piston 34 is loaded in one direction by a spring 35 and by a fluid pressure which is derived by connecting the spring-loaded side of the piston 34 through a restrictor 36 and a port 33 to the pump delivery port 23, and is loaded in the opposite sense by a fluid pressure derived by connecting the other side of the piston 34 directly to the pump delivery through the port 33. The pressure on the spring-loaded side of the piston 34 is varied by bleeding-off fluid from this side of the piston in a controlled manner. On movement of the piston 34 the angle of inclination of the swash plate 21 is adjusted and thus the rate of pump delivery is adjusted.

The fuel supply system is illustrated by way of example as comprising two controls, one of which controls maintains the pressure drop across the throttle 17 (and thus the fuel flow past the throttle) at a predetermined value which is normally varied in accordance with the instantaneous atmospheric pressure, and the second of which controls prevents the engine rotational speed from exceeding a preselected value.

The atmospheric pressure control mechanism is indicated at 31 and comprises a tappet member 39 having a piston-like head which is loaded through pipelines 37 and 38 in accordance with the pressure drop across the throttle 17. The tappet is arranged to load a lever 40 carried on a flexible diaphragm 44 and the lever 40 is also arranged to be loaded in opposition to the load due to the tappet 39 by a spring 42 and in the same sense as by the tappet 39 by an evacuated capsule 43a which is accommodated in a chamber 43, the pressure within which determines the load applied by the capsule 43a to the lever 40. The lever 40 carries a valve element controlling the outflow through an orifice 41 at the outlet end of a bleed pipe 41a connected with the spring loaded side of the piston 34. As the outflow through the orifice 41 is allowed to increase by rocking the lever 40 in one direction so the pressure on the spring-loaded side of the piston 34 decreases and the piston 34 moves to reduce the angle of inclination of the swash plate 21 and thus also to reduce the rate of delivery of the pump; conversely as the bleed flow is decreased so the rate of delivery of the pump is increased.

The tappet 39 and the capsule 43a both load the lever 40 in a direction to open the valve to increase the bleed flow through orifice 41 and so the device operates to maintain a predetermined pressure drop across the throttle 17 for each pressure to which the capsule 43a is subjected.

As the pressure in chamber 43 increases, the capsule 43a collapses and reduces the effective load due to the capsule on the lever 40; thus the load due to the tappet 39 necessary to balance the load due to spring 42 must increase and consequently, on increase of the pressure in chamber 43, the pressure drop across the throttle 17 will be increased. Conversely on fall of the pressure in chamber 43, the pressure drop across the throttle 17 decreases. It will be understood therefore that for any particular setting of the throttle 17 the rate of fuel supply to the engine is maintained at a selected value which is varied in accordance with the pressure in the chamber 43. The atmospheric pressure control mechanism as so far described is well known.

The pressure in chamber 43, in accordance with one feature of this invention, is varied for the purpose which will appear hereinafter.

The top speed governor mechanism forming the second control is illustrated as comprising in known manner a bleed duct 45 leading from the spring-loaded side of the piston 34. The outflow through bleed duct 45 is controlled by a lever 48 which carries a valve element 46 normally loaded in the sense of closing by a spring 48a. The top speed governor mechanism also comprises a flexible diaphragm 47 carrying a centrally-disposed nib to engage the lever 48 to rock it in a valve opening direction, and a tension spring 50 to load the diaphragm 47 to oppose engagement of the nib with the lever 48. The diaphragm 47 is arranged to be loaded by a fluid pressure which is representative of the engine rotational speed and in this embodiment the pressure is derived from the pump rotor body 18 which is formed to act as a centrifugal pump by being provided with a central bore 51 leading to a number of radiating bores 52 opening into a chamber 53 part of the wall of which is afforded by the diaphragm 47. Since the pump rotor 18 is engine-driven the pressure within the chamber 53 will vary as a function of the engine rotational speed and thus the position of the diaphragm 47 will depend on the engine rotational speed. The load of spring 50 on the diaphragm 47 is adjusted so that when the engine rotational speed reaches the maximum permissible value, the nib carried by the diaphragm 47 engages and rocks the lever 48 and permits a bleed flow through the bleed duct 45 so permitting the piston 34 to move to reduce the swash plate inclination and the stroke of the plungers 19.

In addition to the gas-turbine engine being supplied with fuel for combustion with air in the combustion equipment 11, the engine is arranged for the supply of an additional fluid in the nature of a cooling fluid. In the arrangement shown the cooling fluid is assumed to be water and in the drawings is shown as being contained in a water tank 60 from which it is drawn off by an air-turbine-driven centrifugal pump 61 through a suction pipe 63. The pump delivers the water through a delivery pipe 62 containing a non-return valve 64 to a water distributing manifold 65 located within the combustion equipment 11 downstream of the fuel injectors 15, there being a return flow pipe 66 containing a relief valve 67 the purpose of which is to maintain constant the water delivery pressure from the air-turbine-driven pump 61.

The air-turbine-driven pump is shown as being supplied with compressed air for driving the air turbine through a conduit 68 leading to the air-turbine-driven pump from the outlet of the compressor 10. The conduit 68 has in it a shut-off cock 69 which must be opened before the cooling liquid supply can be initiated. The shut-off cock 69 is conveniently electrically operated and the current supply to the solenoid of the cock 69 is shown as being through relay contacts 75a which are closed by a relay coil supplied with current through a switch 70 which is closed when the pilot's engine control lever 71 is moved to the full throttle position, a switch 72 which is closed by the pilot when he desires to initiate cooling fluid injection, a speed over-ride switch 73 which is closed only when the engine rotational speed is above a selected value, and a time controlled switch 74. The speed override switch 73 is illustrated as being connected to a flexible diaphragm 76 one side of which is loaded at the compressor delivery pressure and the other side of which is subjected to atmospheric pressure and loaded by a compression spring 79; a conduit 77 connects a casing 78 within which the diaphragm 76 is contained to the duct 68 and thus to the compressor delivery.

On supplying cooling fluid to the combustion equipment 11, the temperature of the gases entering the turbine 12 is considerably reduced and the present invention takes advantage of this fact to enable the power developed by the engine to be increased.

Since the allowable stress in the rotor blades of the turbine increases rapidly as the operating temperature of the turbine blades is decreased, there is provided in accordance with this invention means which operates on initiation of the cooling fluid supply to increase the maximum permissible speed at which the engine may run.

In the embodiment illustrated in Figure 1, this control is achieved by adjusting the spring load on the diaphragm 47 of the top speed governor mechanism, and also by varying the pressure within the chamber 43 of the atmospheric pressure control mechanism 31.

The spring 50 for loading the diaphragm 47 is shown as being provided with an adjustable anchorage in the form of a piston 80 having a flanged head 81 which forms a movable wall for a chamber 82 which is connected through a pipeline 83 to the water delivery pipe 62 just upstream of the non-return valve 64; the flanged head 81 of the piston 80 also forms a moving wall for a chamber 84 which is open to atmosphere. It will be seen that when water is being delivered to the engine the pressure within the chamber 82 is increased so displacing the piston 80 and increasing the spring load on the diaphragm 47 due to the spring 50. Thus the pressure within the chamber 53 necessary to displace the diaphragm 47 and raise valve element 46 is increased and the rotational speed at which the top speed governor is operated is increased.

The piston 80 also carries a pair of abutments 85, 86 which co-operate with a fixed stop 87 to limit the travel of the piston 80 in both directions.

Where the throttle valve 17 is capable of being opened beyond the normal full throttle position to achieve the increased maximum speed, the above-described mechanism is sufficient by itself. However, where an atmospheric pressure control as shown at 31 is provided, and it is desired to have substantially the same range of throttle travel as with the unboosted engine, the relation between the pressure drop across the throttle valve 17 and the atmospheric pressure must be modified.

This is achieved in accordance with the present embodiment of the invention by varying the pressure within the chamber 43 of the atmospheric pressure control mechanism 31 in relation to the atmospheric pressure.

It is arranged that during normal running of the engine without cooling fluid injection, the chamber 43 is connected to atmosphere and that when cooling fluid injection commences the pressure within the chamber 43 is increased to a value above the ambient atmospheric pressure.

The chamber 43 is shown as being connected by a conduit 90 to a valve casing 91. The casing is divided into two chambers 92, 93 by a flexible diaphragm 94 carrying centrally of itself a lift valve element 95 which co-operates with an outlet 96 leading to atmosphere from the chamber 92. The conduit 90 also opens into the chamber 92 and this chamber is also connected through a restrictor 97 to a conduit 98 leading to the conduit 68 and thus to the compressor delivery chamber 92 also contains a compression spring 94a which normally holds element 95 off the outlet 96, and there may also be provided a restricted outlet from chamber 92 to atmosphere, which may conveniently be positioned in a T connection to conduit 90. The chamber 93 is connected by a pipeline 99 to the water supply pipe 62 at a point upstream of the non-return valve 64.

In operation, when water is not being delivered to the combustion equipment 11 of the engine, the flexible diaphragm 94 is spring urged to move the valve element 95 away from the outlet 96 and so the pressure within the chamber 92 and thus within the chamber 43 is atmospheric pressure. On supply of water to the engine, however, the diaphragm 94 is loaded in the sense of closing the valve element 95 onto the outlet 96. Air under pressure is being supplied to the chamber 92 through the restrictor 97, and therefore where there is no restricted outlet from chamber 92 the pressure within the chamber 92 will increase to a value dependent upon the water supply pressure the diaphragm area, and the spring load, the value being that at which the valve opens, and the pressure within the chamber 43 of the control 31 will also increase. In another arrangement, the chamber 92 has parallel arranged outlets, one being the outlet 96 controlled by the valve element 95, and the second being a restrictor; in this case it is arranged that the element 95 is held firmly on its seat 96 by the water pressure, and thus the pressure in chamber 92 during coolant injection is determined as a proportion of the compressor delivery pressure by the relative sizes of restrictor 97 and the restrictor forming the second outlet.

This increase of the pressure within the chamber 43 will in effect cause the capsule 43a to sense an "atmospheric pressure" greater than the actual atmospheric pressure and so the load due to the capsule on the lever 40 will decrease causing the valve element to close the outlet orifice 41 and thus causing an increase in the stroke of the pump, and an increase in the load applied to the lever by tappet 39 due to the pressure drop across the throttle 17, which increase in load corresponds to the increase in the fuel delivery to the engine.

Referring now to Figure 4, there is shown an alternative way in which the speed at which the top speed governor mechanism operates can be increased when cooling fluid is supplied to the engine.

In this arrangement, the spring 50 has an anchorage 101 which may be manually adjustable but is not moved during operation of the engine as in the construction of Figure 1.

In order to obtain a variation in the governed speed, the pressure obtained in chamber 53 for a given rotational speed of the pump body 18 is varied, being reduced on cooling fluid injection so requiring a higher rotational speed before lever 48 is rocked to open the valve 46.

For this purpose a bleed port 102 is provided from chamber 53 leading through a restrictor 102a to a drain pipe 103 and controlled by a lift valve 104. The valve 104 is connected by a rod 105 to a piston 106 which is displaced in its cylinder 107 against a spring 108 by the pressure of the cooling fluid supply which is conveyed to the device by the pipeline 83 above referred to.

On initiation of the cooling fluid supply, the piston 106 moves to the left so opening the port 102 and reducing the pressure in chamber 53 at a given rotational speed. Thus a higher speed will be necessary to open the valve 46.

Referring now to Figure 5, there is a similar arrangement applied to a top speed governor whereof the setting is varied in accordance with the setting of the pilot's engine control lever by which the engine throttle 71 is set.

The control lever is indicated at 109 and it is connected by a suitable connection shown for convenience as a rod 110 to one arm of a bell-crank 111. The other arm of the bell-crank 111 is arranged to displace an abutment 112 for a compression spring 113 which takes the place of the tension spring 50. The spring 113 has a second abutment 114 which has a central projection 115 to load the lever 48 in a direction to close the valve 46.

The diaphragm 47 has a guide rod 116 and a projection 117 by which it acts on the lever 48 in opposition to the projection 115.

In operation, on movement of the pilot's control lever 109 to increase the fuel supply the lever 111 is rocked to increase the spring load due to spring 113 on the lever 48, and the lever 48 is rocked to open valve 46 when the pressure on the diaphragm 47 and thus the engine speed reaches a value dependent on the setting of the lever 109.

The value of the engine speed is increased on cooling fluid injection as described for Figure 4.

Instead of the valve 46 controlling the pump output directly, it may be arranged to control the pressure drop across the throttle valve 17, and thus indirectly to control the delivery of fuel to the engine, and hence its speed.

Referring now to Figure 2, there is illustrated one method by which two engines such as have just been described may be controlled. In this arrangement, the engines are supplied with cooling fluid from a common cooling fluid supply line 62, there being branches 62a from the pipeline 62 to the engines downstream of the non-return valve 64. In this arrangement also the air supply to the air turbine of the cooling fluid pump 61 is taken jointly from the compressors of the two engines, there being tapping conduits 68a from the two compressors leading to the common air supply conduit 68. Each of the tapping conduits 68a has fitted in it a non-return valve 68b. In this arrangement the engines are provided with a common adjusting mechanism for the speed governor and, where necessary, for the atmospheric pressure control mechanism, as described with respect to Figures 1, 4 and 5. The electrical circuit to the shut-off cock 69 will contain two switches 70, one for each of the pilot's control levers 71.

In this arrangement, moreover, the conduits 77 and 98 (if provided) are connected to the air supply conduit 68 downstream of the non-return valve 68b in the tapping conduits 68a and the pipes 83 and 99 (if provided) are connected to the water supply pipe 62 upstream of the non-return valve 64.

Referring now to Figure 3, there is illustrated another arrangement in which the engines are supplied with cooling fluid from a common supply pipe 62 through branches 62a and in which the air turbine of the cooling fluid pump 61 is supplied jointly by the two engines through tapping conduits 68a containing non-return valves 68b.

In this arrangement, however, the engines are provided with individual controls and therefore in this arrangement the conduits 77 and 98 (if provided) are connected to the respective tapping conduit 68a upstream of the corresponding non-return valve 68b, and the pipes 83 and 99 (if provided) are connected to the branch pipe 62a upstream of individual non-return valves 64a and downstream of electrically operated individual shut-off cocks 100. In this arrangement the air shut-off cock 69 is governed by closure of switches 70 associated with both the pilot's control levers 71, but the high-pressure water shut-off cocks 100 are controlled by circuits containing individual throttle control switches similar to the switches 70.

I claim:

1. A prime mover including a rotor, combustion means wherein fuel is burnt to heat a working fluid flowing in the prime mover, a fuel supply system supplying fuel to the combustion means and including a manually-controlled throttle adjustable to select a desired rotational speed of the rotor, speed governor means responsive to the rotor rotational speed and operative to maintain a predetermined fuel flow past said throttle, said governor means including a loading spring adapted by its load to determine the predetermined fuel flow and an adjustable anchorage for the loading spring, a supply of cooling fluid under pressure, injection means connected to said cooling fluid supply and adapted to inject the cooling fluid into said combustion means to reduce the temperature to which the working fluid is heated by combustion of fuel, and pressure-responsive means connected to the supply of cooling fluid to respond to the pressure thereof and connected to said anchorage to adjust it on operation of the cooling fluid injection means in the sense of increasing the value at which fuel flow past the throttle is maintained.

2. A prime mover as claimed in claim 1, wherein the governor means includes a pressure-responsive element adapted to respond to atmospheric pressure and to adjust the value of the maintained fuel flow in accordance with variations of atmospheric pressure, and wherein the pressure-responsive element is arranged to be subjected to an increased pressure on injection of the cooling fluid.

3. A prime mover as claimed in claim 1, wherein the pressure-responsive element is accommodated within a chamber having an outlet to atmosphere, and a connection to a pressure air source, and wherein there is provided a valve to control said outlet, the valve being urged towards closing the outlet when said cooling fluid is injected.

4. A prime mover as claimed in claim 3, wherein said valve is carried by a flexible diaphragm and the diaphragm is adapted to be loaded towards closure of the valve by a pressure in the cooling fluid supply.

5. A gas-turbine engine comprising a fuel system including a maximum speed governor adapted to reduce the supply of fuel to said engine when said maximum speed is exceeded and comprising a pressure-sensitive element forming a wall of a pressure space, means to produce a fluid pressure representative of the engine rotational speed connected to said pressure space to load said pressure-sensitive element, and a spring connected to said pressure-sensitive element to load it in opposition to said fluid pressure load, an outlet from said pressure space, a valve member controlling said outlet and adapted on operation to vary the pressure within said pressure space for a given engine rotational speed, means to inject a cooling fluid into said engine including a source of said cooling fluid under pressure, and second pressure-sensitive means connected to be loaded by said pressure cooling fluid on injection of the cooling fluid into the engine and also connected to adjust said valve to reduce the pressure within said pressure space on injection of the cooling fluid into the engine.

6. A jet-propulsion gas turbine engine comprising a fuel system including speed governor means to prevent the rotational sped of said engine from exceeding a selected value and having a first pressure-sensitive element, means producing a fluid pressure representative of the rotational speed of said engine, said first pressure-sensitive element being loaded by said fluid pressure in one sense, and a spring connected to said pressure-sensitive element to load it in opposition to said fluid pressure load, said pressure-sensitive element effecting a control to prevent said selected value of rotational speed being exceeded, means to inject a cooling fluid under pressure into said engine including a cooling fluid supply conduit, a second pressure-sensitive element connected to be loaded in one sense by the pressure of said cooling fluid on initiation of the supply of said fluid to said engine to be moved thereby, and means operable to modify the relationship between the fluid pressure load on said first pressure-sensitive element and the load of said spring which means is connected to said second pressure-sensitive element to be operated thereby in the sense to increase the selected value of the rotational speed of said engine on initiation of the cooling fluid injection, said means to modify the relationship between the fluid pressure load and the spring load comprising an adjustable anchorage for said spring, the anchorage being connected to the second pressure-sensitive element to be adjusted thereby on movement of the second pressure-sensitive element, and said fuel system also including fuel supply control means connected to be operated on initiation of said cooling fluid supply to the engine in the sense to increase the fuel supply to the engine to increase its rotational speed.

7. A jet-propulsion gas turbine engine according to claim 6, wherein said fuel supply control means includes a chamber, a pressure-responsive device accommodated in the chamber and controlling the fuel supply, said chamber having an outlet to atmosphere and a restricted pressure fluid supply inlet, a valve controlling said outlet which valve is open when cooling fluid supply is inoperative and is closed on initiation of the cooling fluid supply.

8. A jet-propulsion gas turbine engine comprising a fuel system including speed governor means to prevent the rotational speed of said engine from exceeding a selected value and having a first pressure-sensitive element, means producing a fluid pressure representative of the rotational speed of said engine, said first pressure-sensitive element being loaded by said fluid pressure in one sense, and a spring connected to said pressure-sensitive element to load it in opposition to said fluid pressure load, said pressure-sensitive element effecting a control to prevent said selected value of rotational speed being exceeded, means to inject a cooling fluid under pressure into said engine including a cooling fluid supply conduit, a second pressure-sensitive element connected to be loaded in one sense by the pressure of said cooling fluid on initiation of the supply of said fluid to said engine to be moved thereby, and means operable to modify the relationship between the fluid pressure load on said first pressure-sensitive element and the load of said spring which means is connected to said second pressure-sensitive element to be operated thereby in the sense to increase the selected value of the rotational speed of said engine on initiation of the cooling fluid injection, said means to modify the relationship between the fluid pressure load and the spring load comprising a chamber of which said first pressure-sensitive element forms a wall, a restricted outlet from said chamber, and a valve controlling said outlet, said valve being connected to be opened on movement of said second pressure-sensitive element on initiation of the cooling fluid supply.

9. A jet-propulsion gas turbine engine according to claim 8, comprising also fuel supply control means connected to be operated on initiation of said cooling fluid supply to the engine in the sense to increase the fuel supply to the engine to increase its rotational speed.

10. A jet-propulsion gas turbine engine according to claim 9, wherein said fuel supply control means includes a chamber, a pressure-responsive device accommodated in the chamber and controlling the fuel supply, said chamber having an outlet to atmosphere and a restricted pressure fluid supply inlet, a valve controlling said outlet which valve is open when cooling fluid supply is inoperative and is closed on initiation of the cooling fluid supply.

11. A jet-propulsion gas turbine engine according to claim 8, comprising an adjustable anchorage, said spring being connected to the anchorage, an adjustable throttle controlling the fuel supply by said fuel system, and a linkage interconnecting said throttle and said anchorage to move the anchorage on adjustment of the throttle in the sense of increasing the selected value of the rotational speed on increase of the fuel supply by the throttle.

12. A jet-propulsion gas turbine engine according to claim 11, comprising also fuel supply control means connected to be operated on initiation of said cooling fluid supply to the engine in the sense to increase the fuel supply to the engine to increase its rotational speed.

13. A jet-propulsion gas turbine engine according to claim 12, wherein said fuel supply control means includes a chamber, a pressure-responsive device accommodated in the chamber and controlling the fuel supply, said chamber having an outlet to atmosphere and a restricted pressure fluid supply inlet, a valve controlling said outlet which valve is open when cooling fluid supply is inoperative and is closed on initiation of the cooling fluid supply.

14. A jet-propulsion gas turbine engine according to claim 6, wherein said fuel supply control means includes a chamber, a pressure-responsive device accommodated in the chamber and controlling the fuel supply, said chamber having an outlet to atmosphere and a restricted pressure fluid supply inlet, a valve controlling said outlet which valve is open when cooling fluid supply is inoperative and is closed on initiation of the cooling fluid supply.

15. A jet-propulsion gas turbine engine comprising a fuel system including speed governor means to prevent the rotational speed of said engine from exceeding a selected value and having a first pressure-sensitive element, means producing a fluid pressure representative of the rotational speed of said engine, said first pressure-sensitive element being loaded by said fluid pressure in one sense, and a spring connected to said pressure-sensitive element to load it in opposition to said fluid pressure load, said pressure-sensitive element effecting a control to prevent said selected value of rotational speed being exceeded, means to inject a cooling fluid under pressure into said engine including a cooling fluid supply conduit, a second pressure-sensitive element connected to be loaded in one sense by the pressure of said cooling fluid on initiation of the supply of said fluid to said engine to be moved thereby, and means operable to modify the relationship between the fluid pressure load on said first pressure-sensitive element and the load of said spring which means is connected to said second pressure-sensitive element to be operated thereby in the sense to increase the selected value of the rotational speed of said engine on initiation of the cooling fluid injection, and said fuel system also including fuel supply control means connected to be operated on initiation of said cooling fluid supply to the engine in the sense to increase the fuel supply to the engine to increase its rotational speed.

References Cited in the file of this patent

UNITED STATES PATENTS

| | | |
|---|---|---|
| 2,365,616 | Zweiffel | Dec. 19, 1944 |
| 2,429,005 | Watson et al. | Oct. 14, 1947 |
| 2,657,530 | Lee | Nov. 3, 1953 |
| 2,702,560 | Bobier | Feb. 22, 1955 |

FOREIGN PATENTS

| | | |
|---|---|---|
| 580,149 | Great Britain | Aug. 8, 1946 |